United States Patent [19]
Beck et al.

[11] Patent Number: 5,954,383
[45] Date of Patent: Sep. 21, 1999

[54] TAILGATE ASSIST-EZEE LIFT

[75] Inventors: Earl Edward Beck; Margaret Evelyn Beck, both of Anderson, Ind.

[73] Assignee: Earl E. Beck, Anderson, Ind.

[21] Appl. No.: 09/083,270

[22] Filed: May 22, 1998

[51] Int. Cl.⁶ .................................................. B60P 1/267
[52] U.S. Cl. ............................................ 296/50; 296/57.1
[58] Field of Search .................... 296/50, 57.1, 64 FOR; 16/72, 76, 78, 85; 414/537

[56] References Cited

U.S. PATENT DOCUMENTS

| | | | |
|---|---|---|---|
| 611,997 | 10/1898 | Gillihan | 16/72 |
| 1,802,385 | 5/1931 | Ferrin | 16/72 |
| 1,819,187 | 8/1931 | McFerrin | 16/72 |
| 1,880,870 | 10/1932 | Demo | 16/78 |
| 3,517,408 | 6/1970 | Manse | 16/72 |

FOREIGN PATENT DOCUMENTS

| | | | |
|---|---|---|---|
| 7407939 | 12/1975 | Netherlands | 296/50 |
| 309693 | 4/1929 | United Kingdom | 296/57.1 |
| 510464 | 8/1939 | United Kingdom | 196/61 |

*Primary Examiner*—Dennis H. Pedder

[57] ABSTRACT

This invention is a tailgate lift kit which incorporates two pulleys mounted in a housing in the side wall region of a pickup truck, an elongated coiled spring has one end fixedly mounted at one end of the housing on an adjustable bolt for spring tension adjustment. A cable extends from the tailgate of the pick up truck, over the first pulley, around the second pulley which is fastened to the second end of the spring, and the second end of the cable fastens to the housing near the first pulley.

1 Claim, 1 Drawing Sheet

TAILGATE ASSIST-EZEE LIFT

BACKGROUND OF THE INVENTION

This invention is a tailgate lift kit which mounts in the side wall region of a pickup truck bed. It consists of a housing, 2 pulleys, an adjustment bolt for spring tension, an elongated spring and a cable.

One pulley mounts to one end of the housing. The second pulley is fastened to one end of the elongated spring. The other end of the spring is affixed to the other end of the rail on an adjustable bolt for spring tension adjustment.

One end of the cable is fastened to the lower part of the housing near the first pulley, then wraps 180° around the second pulley, which is fastened to the spring, routed along the housing, over the first pulley and fastened to the tailgate.

When the tailgate is lowered, the cable extends from the pulley assembly placing the spring in tension, reducing tailgate weight, lessening the possibility of injury to children, women and people with weak arms (elderly, etc . . . ).

The overall assembly is made small, thereby facilitating its mounting in the side wall region of a pickup truck bed.

According to this invention, a pickup truck tailgate that pivots on an axis at the bottom supported on pivots secured to the truck from a vertical closed position to a horizontal open position and being made of a double panel of steel generates a lot of weight.

This spring loading cable and pulley invention reduces the weight depending on spring tension from the full weight of the tailgate depending on various models. To a minus weight if desired thereby reducing risk of injury to the tailgate operator. When tailgate is in vertical position and latch is released, tailgate can be eased down without dropping caused by weight of the tailgate because of the tension of the cabled spring. When tailgate is closed from horizontal position, the spring tension on the cable fastened to the tailgate effectively reduces the weight of the tailgate making it easy to close, thereby reducing possible injury to back or arms of the operator.

DETAILED DESCRIPTION OF THE DRAWINGS

Figure 1:
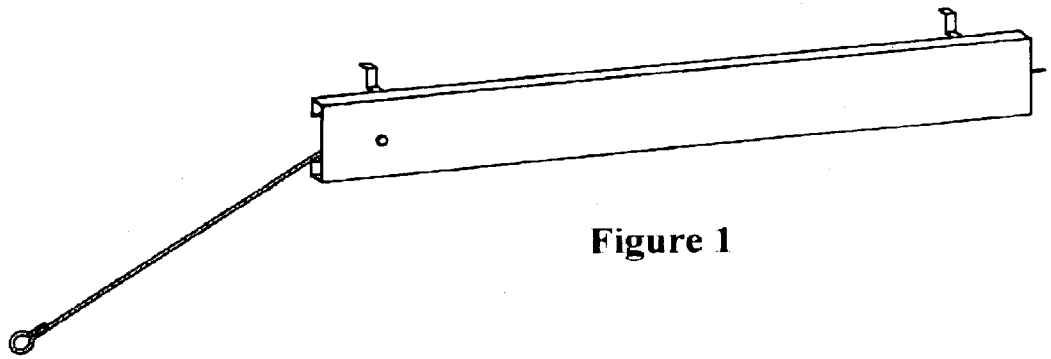
Figure 2:
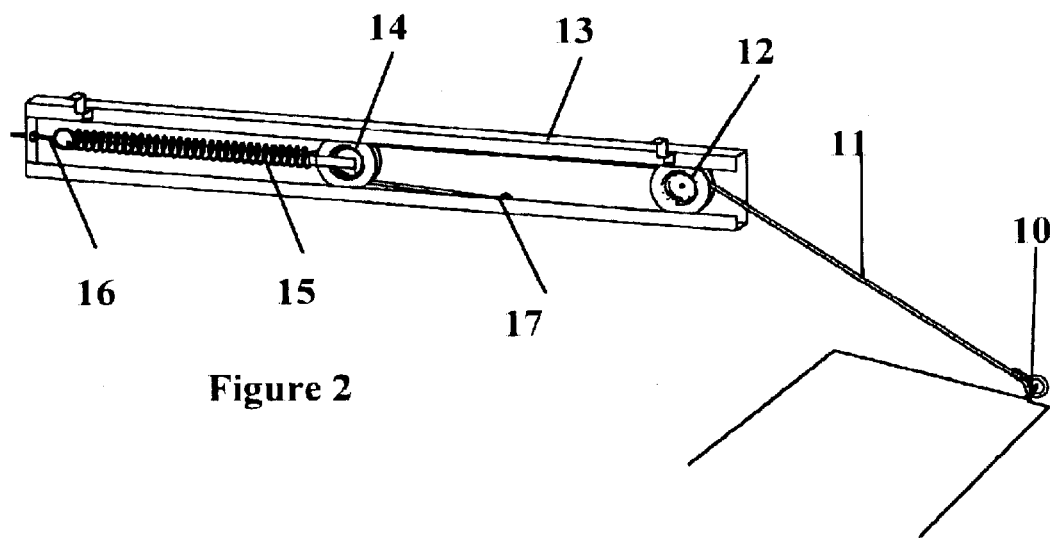
Figure 3:

FIGS. 1 through 3 along with description of operation and reasons for use will help understand this invention.

When a pickup truck tailgate is in vertical closed position, it is balanced on pivots on each end of the tailgate and latched at each end.

When the latch is released and the tailgate starts to open to a horizontal position, all the weight is transferred to the operator. If the weight is too much for the operator (i.e. woman or small child) injury to the operator or damage to the tailgate can result.

With this invention installed, the tailgate becomes virtually weightless. See FIG. 2.

When the tailgate is unlatched in a vertical closed position and starts to open, the weight of the tailgate is transferred to the cable #11 which is attached to the tailgate #10 and runs over a pulley #12 which is housed in a channel shape housing #13 and thus along housing #13 to another pulley #14 which is attached to one end of an elongated spring #15 with the other end hooked on adjustment bolt #16 mounted in the end of the housing #13 opposite the end of the pulley #12.

Then the cable #11 runs 180° around the pulley #14 and mounted at #17 to the lower part of the housing #13 just behind the pulley #12. When tailgate #10 is lowered the spring #15 stretches and effectively reduces the weight of the tailgate #10. When tailgate #10 is in a horizontal open position it is supported by straps and pivots at both ends.

Without this invention the tailgate #10 weight is problematic for the operator. With this invention, the tailgate #10 becomes virtually weightless.

See FIG. 2—with tailgate #10 in horizontal open position the spring #15 is in a stretched and loaded position absorbing the tailgate #10 weight with little and almost no effect on the tailgate operators part. The tailgate #10 can be closed to a vertical from horizontal position with a little lit depending on the amount of tension adjustment of the bolt #16 and spring #15.

When tailgate #10 is starting to close the spring #15 starts to unload exerting pressure on the cable #11 which is attached to both the spring #15 by the way of the pulley #14 and the tailgate #10 effectively reducing the weight of the tailgate #10 making for easy without injury to the operator or damage to the tailgate #10.

In conclusion, FIG. 1 is all you see when installed in side wall region of pickup truck bed.

FIG. 2—Looking at backside shows tailgate in horizontal open position with tension on spring and cable extended.

FIG. 3—Looking at backside of invention shows tailgate in vertical closed position with no tension on cable and spring unloaded. the present invention is described using the tailgate of a pickup truck as the preferred embodiment for illustration, but is intended to cover the application or implementation broadly in the spirit of the claims.

We claim:

1. In combination with a vehicle with a tailgate which is horizontally hinged to the vehicle body, being substantially vertical in the closed position, a pair of tailgate assist assemblies which are mounted to the side walls of the vehicle, each said assembly being comprised of a cable attached to the tailgate at a first end, said cable passing over an entrance pulley at an outer end of a channel shaped housing, said cable passing around an interior pulley at a first end of a coil spring, said cable having a second end anchored to the housing, said coil spring having a second end anchored to the housing via an adjustment bolt.

* * * * *